United States Patent
Okazaki

[15] 3,658,650
[45] Apr. 25, 1972

[54] CELL WALL LYTIC ENZYME AND PROCESS FOR THE PRODUCTION THEREOF

[72] Inventor: Hiroshi Okazaki, Sayama, Japan

[73] Assignees: Chugai Seiyaku Kabushiki Kaisha; Hiroshi Iizuka, Tokyo, Japan

[22] Filed: Mar. 6, 1970

[21] Appl. No.: 17,308

[30] Foreign Application Priority Data

Mar. 12, 1969 Japan.................................44/18312

[52] U.S. Cl......................................195/62, 195/66, 195/2, 195/81, 99/9, 99/14
[51] Int. Cl.................................................C07g 7/02
[58] Field of Search............................195/62, 66, 2

[56] References Cited

UNITED STATES PATENTS 3,124,517   3/1964   Eloy..........................................195/62

OTHER PUBLICATIONS

Chemical Abstracts, Vol. 61, Col. 6067h (1964).

*Primary Examiner*—Alvin E. Tanenholtz
*Attorney*—Browdy and Neimark

[57] ABSTRACT

A cell wall lytic enzyme which possesses an ability to lyse the cell wall of Chlorella, yeasts, etc. is produced by aerobically culturing a microorganism belonging to Genus Micropolyspora which produces a cell wall lytic enzyme in a medium containing assimilable carbon sources, assimilable nitrogen sources and essential inorganic salts and organic nutrients until a substantial amount of the enzyme is accumulated in said medium and isolating said enzyme from the medium, and, if desired, subjecting the thus obtained crude enzyme to the purification step of salting out or dialysis to obtain a purified enzyme solution and further subjecting the enzyme solution to freeze-drying to obtain a powder preparation of said enzyme.

9 Claims, No Drawings

CELL WALL LYTIC ENZYME AND PROCESS FOR THE PRODUCTION THEREOF

This invention relates to a novel enzyme which lyses the cell wall of various microorganisms and a process for the production thereof.

Recently, a process for large scale culturing of yeasts, Chlorella, etc. was established, and attempts have been made to use these cultured microorganisms in foodstuffs or feeds. However, there are many problems in the practical use of the microorganisms because of their poor digestibility.

The present inventor searched for an enzyme which could efficiently lyse the cell walls of the microorganisms, in particular, Chlorella, the cell of which is extremely rigid and can be ruptured only by mechanical means, and found that strain No. 434 belonging to Genus Micropolyspora (deposited with the Fermentation Research Institute, Japan, under No. 276, and the American Type Culture Collection under ATCC 21489) accumulates a cell wall lytic enzyme in a medium when it is aerobically cultured in said medium. On the basis of this finding, the present inventor completed the present invention.

According to the present invention, the cell wall lytic enzyme is prepared by aerobically culturing a microorganism belonging to Genus Micropolyspora which produces a cell wall lytic enzyme in a medium containing assimilable carbon sources, assimilable nitrogen sources and essential inorganic salts and organic nutrients until a substantial amount of the enzyme is accumulated in said medium, and isolating said enzyme from the medium.

The taxonomical characteristics of the microorganism which produces a cell wall lytic enzyme employed in the present invention are as follows.

A. Morphological Characteristics

1. Aerial Mycelium

About 0.7–1.0$\mu$ in diameter. Branched and moderately adhered on medium. White.

2. Substrate Mycelium

Slightly thinner than aerial mycelium; about 0.5–0.7$\mu$ in diameter. It tends to penetrate into agar medium.

3. Formation of Dome-shape bodies

An aggregate of small dome-shape bodies is often observed on the surface of the agar medium.

4. Spore

Spherical or oval. Having a diameter of about 0.8–1.0$\mu$. Mainly formed directly on the side of mycelium. Single spores are sometimes observed, but the spores are mainly in chains of two to 10 spores. The chains are straight, and no spiral chain is observed. The spores are relatively easily separated into discrete spores, and, when shake-cultured, chains longer than two to three spores are not observed. One to two germ-tubes are observed to be generated from the spore when the spore germinates.

5. Fission of Mycelium

Not observed when plate-cultured, but fragments of mycelium of 5–20$\mu$ are often observed in preparing the smear.

6. Composition of Cell Wall

The cell wall is found to be composed of meso-$\alpha$, $\epsilon$-diaminopimelic acid, arabinose, galactose, etc., as measured by paper chromatography after hydrolysis of the cell wall with 6N HCl. Referring to literatures, the microorganisms belonging to Genus Micropolyspora show the same composition as above.

B. Physiological Characteristics (observed on various media)

1. Sucrose Nitrate Agar
   No growth.
2. Glucose Asparagine Agar
   No growth.
3. Glycerol Asparagine Agar
   Moderate growth. Close layers are formed on the surface of the medium. Substrate mycelium; pale brown. Aerial mycelium; white.
4. Bouillon Agar
   Good growth. Aerial mycelium; white. Substrate mycelium; pale brown. No soluble pigment. The medium shows powdery surface.
5. Gelatin Agar
   Slight growth on the surface of the medium after 4 days at 50° C. No liquefaction of gelation is observed on the second day, but moderate liquefaction is observed on the 4th day.
6. Bennet Medium
   Good growth. Aerial mycelium; white. Substrate mycelium; pale brown. Soluble pigment; pale brown.
7. Starch Inorganic-salts Agar
   No growth after 4 days at 50° C. No starch liquefaction.
8. Starch Peptone Beef Agar
   Good growth. Aerial mycelium; white. Substrate mycelium; pale yellow brown. Soluble pigment; pale brown. Starch is completely hydrolyzed after 2 days at 50° C.
9. Dextrin Casein-digested Agar
   Good growth. Aerial mycelium; yellow white. Soluble pigment; pale yellow brown.
10. Nitrate Medium
    Thin film-like growth. Aerial mycelium; white. Nitrate is not reduced.
11. Litmus Milk
    Growth with ring formation. Peptonization is observed after 2 days at 50° C.
12. Potato Plug
    No growth.
13. Cellulose Asparagine Medium
    No growth. Cellulose is not decomposed.
14. Cellulose Dextrin Casein-digest Medium
    Moderate and colony-like growth. Aerial mycelium; white. Almost no decomposition of cellulose is observed.

C. Growth Temperature

On a nutrient agar medium, no growth at 30° C; weak growth at 37° C; moderate growth at 40°–45° C; good growth at 45°–55° C; moderate growth but poor adhesion of aerial mycelium at 55°–60° C; and poor growth at 65° C.

D. Heat-Resistance of Spore

Spore is not killed upon heat-treatment at 100° C for 10 minutes. 2,6-Dipicolinic acid is found to be present when the spore is extracted with hot 80 percent ethanol. The above fact is not observed in known Genus Micropolyspora.

As described above, the microorganism employed in the present invention is characterized mainly by its morphology; the microorganism forms a single spore or spore chains from both aerial and substrate mycelia, but the formation of the spore chains is abundant and yet stable in nature. The microscopic observation of the smear of the mycelia shows a significant rupture of the mycelia. The composition of the cell wall of the present microorganism is identical to that of *Micropolyspora brevicatena* reported in 1961 as a new genus. The present microorganism is also similar to *Micropolyspora brevicatena* in many physiological properties but is distinguishable in that *Micropolyspora brevicatena* shows poor growth on Bouillon agar and further does not grow at a temperature of 50° C.

The fermentation medium employed in the present invention may comprise appropriate carbon sources, nitrogen sources, inorganic salts and organic nutrients. The carbon sources can be a polymer having a relatively high polymerization degree such as starch, dextran, dextrin, inulin, and the like, but sugars having a low polymerization degree such as monosaccharides, disaccharides, and the like are not suitable. The nitrogen sources can be ammonium sulfate, ammonium chloride, ammonium phosphate, ammonium nitrate and the like. The inorganic salts are added to the medium for supplying various elements which are essential to the growth of the microorganism, and may be an appropriate combination of various phosphates, potassium salts, magnesium salts, copper salts, iron salts, manganese salts, zinc salts and the like. The organic nutrients are used for supplying such substances as vitamins, amino acids, etc. which are essential to the growth of the microorganism, and yeast extract, malt extract, etc. are used for such a purpose.

As described above, the medium used in the present invention can be one of the various combinations of the above nutrients, but the medium can also consist of the essential inorganic salts and the living cells of certain yeast, Chlorella, fungi, bacterium, etc. which are sensitive to the enzyme of this invention. In the latter case, the living cells serve as carbon, nitrogen and organic nutrient sources, but better results can be obtained when yeast extract, malt extract, etc. are added to the medium as supplementary organic nutrient sources in addition to the living cells.

The culturing is generally initiated by suspending the culture of Micropolyspora sp. No. 434 in sterilized water by transferring it by means of a platinum loop from the slant culture and adding the resulting seed suspension to a culture medium of the type described above, and is usually completed in a period of from about 16 to about 48 hours while aerating at a temperature of from 40° to 60° C.

The enzyme which lyses the cell wall is accumulated in the medium during the culturing, and a supernatant of the cultured broth obtained by the removal of the mycelia, for example by centrifugation, can be used, as it is, for lysing the cell wall, or it may be freeze-dried to obtain an enzyme preparation in a powder form.

In order to obtain a more purified enzyme preparation, the above crude enzyme solution is subjected to the salting out with ammonium sulfate or to the acetone treatment to precipitate the enzyme. The salting out if effected by adding ammonium sulfate to the enzyme solution to the saturation degree of 0.4, removing the precipitate formed, further adding ammonium sulfate to the enzyme solution to the saturation degree of 0.6 thereby precipitating the enzyme which is then collected. Alternatively, the addition of ammonium sulfate to the enzyme solution can be effected in one step, and, in this case, better results are obtained when ammonium sulfate is added directly to the saturation degree of 0.8. On the other hand, the acetone treatment can be effected by adding acetone to the crude enzyme solution to precipitate the enzyme. The best result is achieved by slowly adding the acetone to a concentration of 60 percent and, after being stirred for about 1 hour, isolating the precipitates. The thus obtained precipitated enzyme is dissolved in an appropriate buffer solution, for example, 0.01 M $KH_2PO_4$ buffer solution (pH 7.0)— and then dialyzed overnight against the same buffer solution. The internal solution (the solution remaining in the dialysis membrane after the dialysis) is a highly purified enzyme solution and can be freeze-dried in the same manner as described above for the crude enzyme solution.

The thus obtained substance is a novel enzyme which easily lyses the cell wall of various microorganisms such as yeast, bacteria, fungi and Chlorella.

The preferred embodiment of this invention is illustrated by the following scheme:

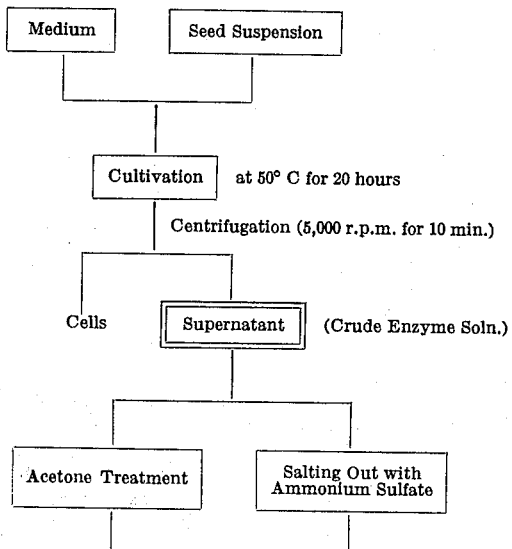

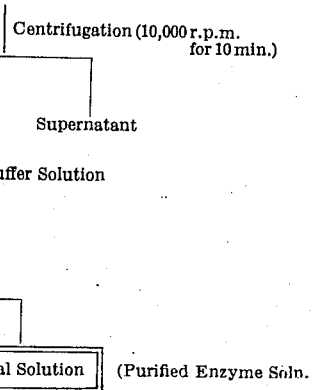

A cell wall lytic enzyme of this invention has following characteristics except those shown in examples below.

a. being stable at a pH range of from 5.0 to 9.0, the optimum pH being in the range of from 7.0 to 8.0, b. being active at a temperature of from 40° to 70° C, particularly, from 50° to 60° C, c. being substantially stable at a low temperature, and not to be inactivated at a temperature of 0° C and inactivated at a temperature of 100° C for 10 minutes, d. being easily soluble in water and dilute salts solution but insoluble in acetone, e. being inhibited strongly by $Ag^+$, $Cu^{++}$, $Hg^{++}$, $Fe^{++}$, $Zn^{++}$, $Cd^{++}$, $Ni^{++}$ and moderately by $Mn^{++}$, $Co^{++}$, but activated by $Mg^{++}$.

The lytic enzyme of this invention enable to extract many useful intracellular substances such as protein, nucleic acid, amino acid, vitamin and enzyme and is useful in many fields.

EXAMPLE 1

Micropolyspora sp. No. 434 was inoculated in the A medium (comprising 5 g of living cells of Candida rugosa JF–101, 1 g of $K_2HPO_4$, 0.5 g of $MgSO_4·7H_2O$ and 1000 ml of distilled water; pH 7.4) and shake-cultured for 24 hours at 50°–55° C whereby the living cells of Candida rugosa JF–101 were completely digested. The resulting culture liquid was then centrifuged at a rate of 5,000 r.p.m. for 10 minutes, and the microbial cells and spores of No. 434 strain were removed to obtain a crude enzyme solution having a potent cell wall lytic activity.

Cell suspension containing living cells of each of the yeasts listed in Table 1 below in a concentration of $10^8$/ml, 0.1% $K_2HPO_4$ and 0.05% $MgSO_4·7H_2O$ in distilled water were prepared and adjusted to pH 7.4. The yeasts employed above were living cells obtained by inoculating each of the yeasts in the medium containing glucose, $(NH_4)_2SO_4$, $KH_2PO_4$, $MgSO·7H_2O$ malt extract and yeast extract, which has been adjusted to the pH 5.4, and culturing the yeasts with shaking for 24 hours at 30° C.

The crude enzyme solution obtained above was adjusted to pH 7.4, and to 3 ml of which was then added 0.2 ml of each of the cell suspension prepared above to allow to react while shaking gently for 4 hours at 50° C. The results, as shown in Table 1, indicated that large portions of the yeast cells were ruptured and digested.

The reduction in the turbidity of the reaction mixture shown in Table 1 was visually determined. The symbol "+++" denotes the case where the cells are completely lysed, the symbol "++" denotes the case where the cells are moderately lysed, and the symbol "+" denotes the case where slight lysis was observed.

The degree of the lysis of the cells are calculated by the following equation:

$$\text{Degree of cell lysis} = \frac{St - Sa}{St} \times 100$$

wherein the $St$ stands for the initial numbers of cells, and the $Sa$ stands for the numbers of unlysed cells remaining in the reaction mixture.

TABLE 1

| Strain | Reduction in turbidity of reaction mixture | Degree of cell lysis (%) |
| --- | --- | --- |
| Candida rugosa JF-101 | ++ | 81 |
| Candida krusei IAM 4801 | ++ | 90 |
| Candida krusei IAM 4489 | +++ | 100 |
| Candida utilis IAM 4215 | +++ | >90 |
| Candida utilis IAM 4295 | +++ | 86 |
| Candida pseudotropicalis IAM 4829 | +++ | 83 |
| Candida parapsilosis IAM 4488 | +++ | 92 |
| Candida lipolytica IAM 4947 | +++ | 93 |
| Saccharomyces cerevisiae IAM 4009 | + | 42 |
| Saccharomyces cerevisiae IAM 4308 | + | 61 |
| Saccharomyces chevalieri IAM 4801 | ++ | 81 |
| Pichia membranaefaciens IAM 4025 | + | 77 |
| Hansenula anomala IAM 4668 | ++ | 86 |
| Schizosaccharomyces pombe IAM 4879 | + | 65 |

EXAMPLE 2

Micropolyspora sp. No. 434 strain was inoculated in the "B" medium (comprising about 10 g of moistened cells of Chlorella ellipsoidea Tamiya, 1 g of $K_2HPO_4$, 0.5 g of $MgSO_4·7H_2O$ and 1 g of yeast extract in 1,000 ml of distilled water; pH 7.4, the medium being sterilized at 120° C for 3 minutes) and cultured at 50° C for 24 hours. The mycelia of No. 434 strain and the unlysed Chlorella cells were removed by centrifugation to give a crude enzyme solution which was found to have a potent activity on both living cells and heat-treated cells (at 90° C for 3 minutes) of chlorella.

To 3.0 ml of the thus obtained crude solution was added 0.2 ml of a suspension of Chlorella cells ($3 \times 10^8$/ml), and the mixture was reacted at 50° C for 18 hours while gently shaking. The results obtained were as shown in Table 2 wherein the turbidity is expressed in terms of the optical density (OD) as measured at a wave length of 530 m$\mu$. The standard solution was prepared by adding, in place of the enzyme solution, a phosphate buffered solution (pH 7.4) to the Chlorella suspension, in an amount equal to that of the enzyme solution.

TABLE 2

| Chlorella cells | Reaction time (hr.) | Turbidity Standard soln. | Reaction mixture |
| --- | --- | --- | --- |
| Living cell | 3 | 0.78 | 0.70 |
| | 19 | 0.77 | 0.56 |
| Heat-treated cell | 3 | 0.84 | 0.77 |
| | 19 | 0.80 | 0.58 |

EXAMPLE 3

To the crude enzyme solution obtained in the same manner as Example 1 was added ammonium sulfate to the saturation degree of 0.4. The precipitates formed were removed, and ammonium sulfate was added to the saturation degree of 0.6. The resulting precipitates were collected by centrifugation and suspended in distilled water, and the suspension was dialyzed through cellophane bag to give a purified enzyme.

The thus obtained purified enzyme was added to a liquid sample containing heat-treated mycelia of Aspergillus orizae IAM-2024. After the mixture was reacted at 50° C for 4 hours, it was found that most of the cell walls of the mycelium had been ruptured.

2.0 ml of the enzyme solution obtained in Example 3 was also added to 0.3 ml of a cell-suspension ($10^8$/ml) of Escherichia coli IAM-1264 which had been heat-treated at 90° C for 3 minutes. After the pH was adjusted to 7.4, the mixture was reacted for 4 hours at 50° C. whereby about 70 percent of the cells was ruptured.

EXAMPLE 4

Micropolyspora sp. No. 434 strain was inoculated in the C medium (comprising 20 g of starch, 2 g of $(NH_4)_2SO_4$, 2 g of $KH_2PO_4$, 5 g of $K_2HPO_4$, 2 g of $MgSO_4·7H_2O$, 0.006 g of $CuSO_4·5H_2O$, 0.001 g of $FeSO_4·7H_2O$, 0.008 g of $MnCl_2·4H_2O$, 0.002 g of $ZnSO_4·7H_2O$ and 10 g of yeast extract in 1,000 ml of distilled water; pH 7.4), and shake-cultured at 50° C for 24 hours. The culture liquid was centrifuged at a rate of 5,000 r.p.m. for 10 minutes, and the mycelia and spores of the No. 434 strain were removed to give a crude enzyme solution having a potent cell wall lytic activity.

Ammonium sulfate was added to the resulting crude enzyme solution to the saturation degree of 0.8, and the mixture was stirred for 4 to 5 hours at 5° C to give brown precipitates. The thus formed precipitates were separated by centrifugation at a rate of 10,000 r.p.m., dissolved in 90 ml of a 0.01 M phosphate buffered solution (pH 7.0) and dialyzed overnight against the same 0.01 M phosphate buffered solution at 5° C to give a purified enzyme solution as an internal solution which remains in the dialysis bag. This enzyme solution was lyophilized to give 195 mg of pure enzyme in a powder form.

EXAMPLE 5

The crude enzyme solution obtained in the same manner as Example 4 was maintained at 5° C, and ice-cooled acetone was added so as to make 60 percent acetone while stirring, and the stirring was continued for 4 to 5 hours. The precipitates formed were then separated by centrifugation at a rate of 10,000 r.p.m. for 10 minutes and dissolved in 90 ml of a 0.01 M phosphate buffered solution (pH 7.0). The resulting solution was then dialyzed overnight against the same 0.01 M phosphate buffered solution at 5° C to give a purified enzyme solution as an internal solution.

I claim:

1. A cell wall lytic enzyme produced by Micropolyspora sp. No. 434, ATCC 21489 characterized by:
   a. being stable at a pH range of from 5.0 to 9.0, the optimum pH being in the range of from 7.0 to 8.0,
   b. being active at a temperature of from 40° to 70° C, particularly, from 50° to 60° C,
   c. being substantially stable at a low temperature, and not to be inactivated at a temperature of 0° C and inactivated at a temperature of 100° C for 10 minutes,
   d. being easily soluble in water and dilute salts solution but insoluble in acetone,
   e. being inhibited strongly by $Ag^+$, $Cu^{++}$, $Hg^{++}$, $Fe^{++}$, $Zn^{++}$, $Cd^{++}$, $Ni^{++}$ and moderately by $Mn^{++}$, $Co^{++}$, but activated by $Mg^{++}$,
   f. having cell wall lytic activity at least on Candida rugosa, Candida krusei, Candida utilis, Candida pseudotropicalis, Candida parapsilosis, Candida lipolytica, Saccharomyces cerevisiae, Saccharomyces chevalieri, Pichia membranaefaciens, Hansenula anomala and Schizo-saccharomyces pombe.

2. A cell wall lytic enzyme as claimed in claim 1 in a powder form.

3. A process for producing the cell wall lytic enzyme as claimed in claim 1 which comprises aerobically culturing the microorganism Micropolyspora Sp. No. 434, ATCC 21489, which produces a cell wall lytic enzyme in a medium containing assimilable carbon sources, assimilable nitrogen sources and essential inorganic salts and organic nutrients until a substantial amount of the enzyme is accumulated in said medium, and isolating said enzyme from the medium.

4. A process according to claim 3 wherein said culturing is conducted at a temperature in the range of from 40° to 60° C for a period of from 16 to 24 hours.

5. A process for producing the cell wall lytic enzyme as claimed in claim 2 which comprises aerobically culturing the microorganism Micropolyspora Sp. No. 434, ATCC 21489, which produces a cell wall lytic enzyme in a medium containing assimilable carbon sources, assimilable nitrogen sources and essential inorganic salts and organic nutrients until a substantial amount of the enzyme is accumulated in the medium, isolating said enzyme from the medium and freeze-drying said enzyme.

6. A process for preparing the cell wall lytic enzyme as claimed in claim 1 which comprises aerobically culturing the microorganism Micropolyspora Sp. No. 434, ATCC 21489, which produces a cell wall lytic enzyme in a medium containing assimilable carbon sources, assimilable nitrogen sources and essential inorganic salts and organic nutrients until a substantial amount of the enzyme is accumulated in said medium, isolating said enzyme from the medium, salting out the thus obtained crude enzyme in a solution by adding ammonium sulfate, and dialyzing a solution of the resulting precipitates through a dialysis membrane.

7. A process for preparing the cell wall lytic enzyme as claimed in claim 2, which comprises aerobically culturing the microorganism Micropolyspora Sp. No. 434, ATCC 21489, which produces a cell wall lytic enzyme in a medium containing assimilable carbon sources, assimilable nitrogen sources and essential inorganic salts and organic nutrients until a substantial amount of said enzyme is accumulated in said medium, isolating the enzyme from the medium, salting out the thus obtained crude enzyme in a solution by adding ammonium sulfate, dialyzing a solution of the resulting precipitates through a dialysis membrane, and freeze-drying the resulting internal solution.

8. A process for preparing the cell wall lytic enzyme as claimed in claim 1 which comprises aerobically culturing the microorganism Micropolyspora Sp. No. 434, ATCC 21489, which produces a cell wall lytic enzyme in a medium containing assimilable carbon sources, assimilable nitrogen sources and essential inorganic salts and organic nutrients until a substantial amount of the enzyme is accumulated in said medium, isolating said enzyme from the medium, adding acetone to the thus obtained crude enzyme in a solution so as to make 60 percent acetone, and dialyzing a solution of the resulting precipitates through a dialysis membrane.

9. A process for preparing the cell wall lytic enzyme as claimed in claim 2 which comprises aerobically culturing the microorganism Micropolyspora Sp. No. 434, ATCC 21489, which produces a cell wall lytic enzyme in a medium containing assimilable carbon sources, assimilable nitrogen sources and essential inorganic salts and organic nutrients until a substantial amount of said enzyme is accumulated in said medium, isolating the enzyme from the medium, adding acetone to the thus obtained crude enzyme in a solution so as to make 60 percent acetone, dialyzing a solution of the resulting precipitates through a dialysis membrane, and freeze-drying the resulting internal solution.

* * * * *

UNITED STATES PATENT OFFICE
CERTIFICATE OF CORRECTION

Patent No. 3,658,650                    Dated April 25, 1972

Inventor(s)  Hiroshi OKAZAKI

It is certified that error appears in the above-identified patent and that said Letters Patent are hereby corrected as shown below:

Column 5, line 35, change "90°" to read —98°—

Signed and sealed this 5th day of September 1972.

(SEAL)
Attest:

EDWARD M.FLETCHER,JR.            ROBERT GOTTSCHALK
Attesting Officer                Commissioner of Patents